United States Patent
MacDonald et al.

(10) Patent No.: US 11,313,693 B2
(45) Date of Patent: Apr. 26, 2022

(54) SYSTEM AND PROCESS FOR CLOSEST IN PATH VEHICLE FOLLOWING USING SURROUNDING VEHICLES MOTION FLOW

(71) Applicant: GM GLOBAL TECHNOLOGY OPERATIONS LLC, Detroit, MI (US)

(72) Inventors: Ryan A. MacDonald, Markham (CA); Mohammadali Shahriari, Markham (CA); Dorothy Lui, North York (CA); Donovan J. Wisner, Ann Arbor, MI (US); Benjamin J. Gaffney, Waterloo (CA)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 16/807,749

(22) Filed: Mar. 3, 2020

(65) Prior Publication Data
US 2021/0278231 A1    Sep. 9, 2021

(51) Int. Cl.
| | |
|---|---|
| *G01C 21/34* | (2006.01) |
| *G08G 1/0968* | (2006.01) |
| *G08G 1/0962* | (2006.01) |
| *G08G 1/01* | (2006.01) |

(52) U.S. Cl.
CPC ........ *G01C 21/3492* (2013.01); *G08G 1/0133* (2013.01); *G08G 1/09626* (2013.01); *G08G 1/096827* (2013.01)

(58) Field of Classification Search
CPC ............. G01C 21/3492; G08G 1/0133; G08G 1/09626; G08G 1/096827
See application file for complete search history.

(56) References Cited

U.S. PATENT DOCUMENTS

| | | | |
|---|---|---|---|
| 2010/0256852 A1* | 10/2010 | Mudalige | G08G 1/22 |
| | | | 701/24 |
| 2019/0088135 A1* | 3/2019 | Do | G05D 1/0055 |

* cited by examiner

*Primary Examiner* — Maceeh Anwari
*Assistant Examiner* — Charles Pall
(74) *Attorney, Agent, or Firm* — Quinn IP Law

(57) ABSTRACT

A system for closest in path vehicle following using surrounding vehicles motion flow is provided and includes a sensor device of a host vehicle generating data related to vehicles upon a drivable surface. The system further includes a navigation controller including a computerized processor operable to monitor the data from the sensor device, define a portion of the plurality of vehicles as a swarm of vehicles, identify one of the plurality of vehicles as a closest in path vehicle to be followed, evaluate the data to determine whether the closest in path vehicle to be followed is exhibiting good behavior in relation to the swarm of vehicles, and, when the closest in path vehicle to be followed is exhibiting the good behavior, generate a breadcrumbing navigation path based upon the data. The system further includes a vehicle controller controlling the host vehicle based upon the breadcrumbing navigation path.

20 Claims, 5 Drawing Sheets

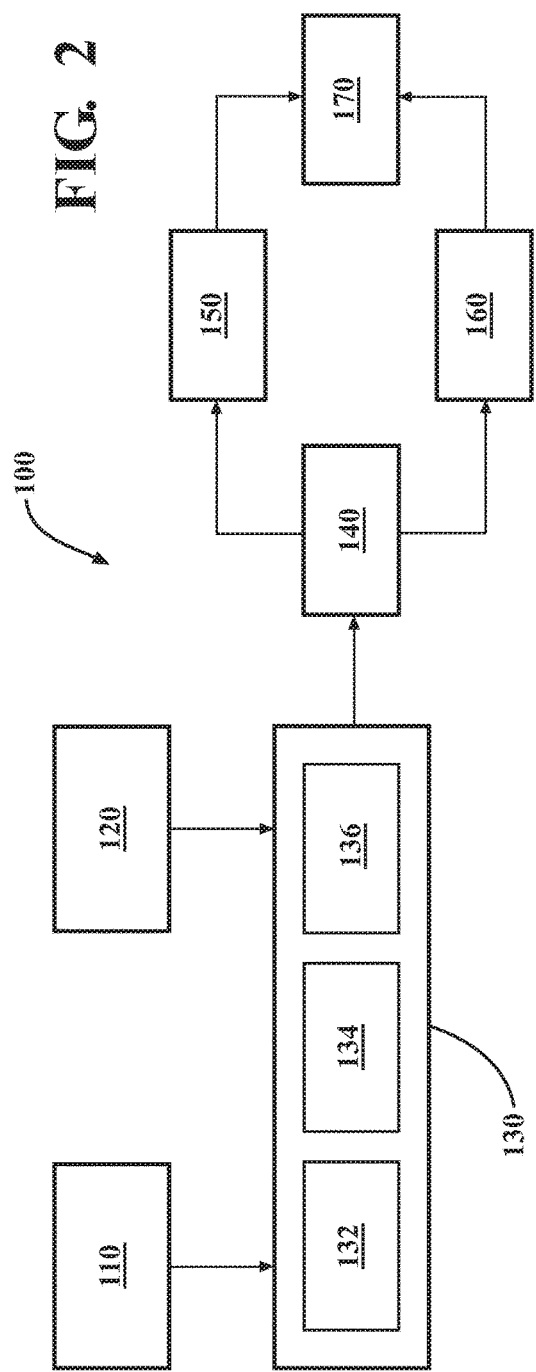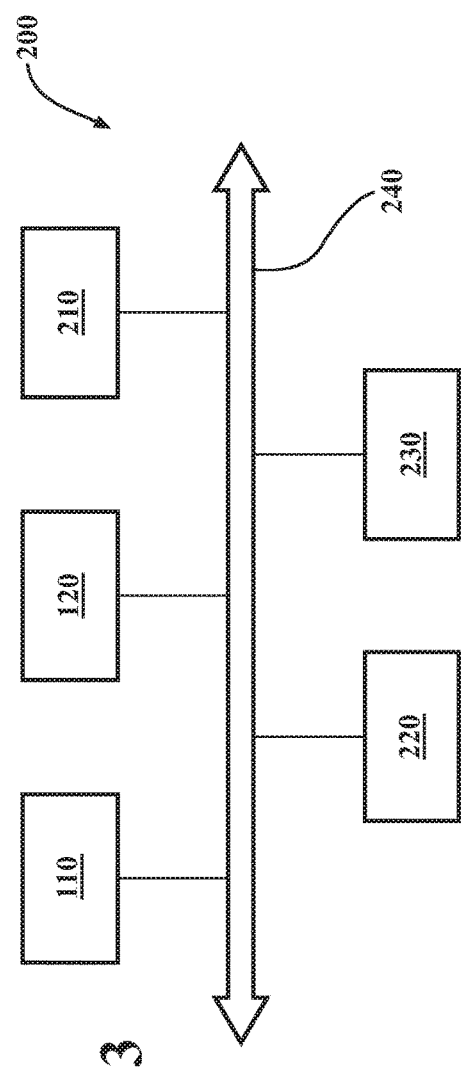

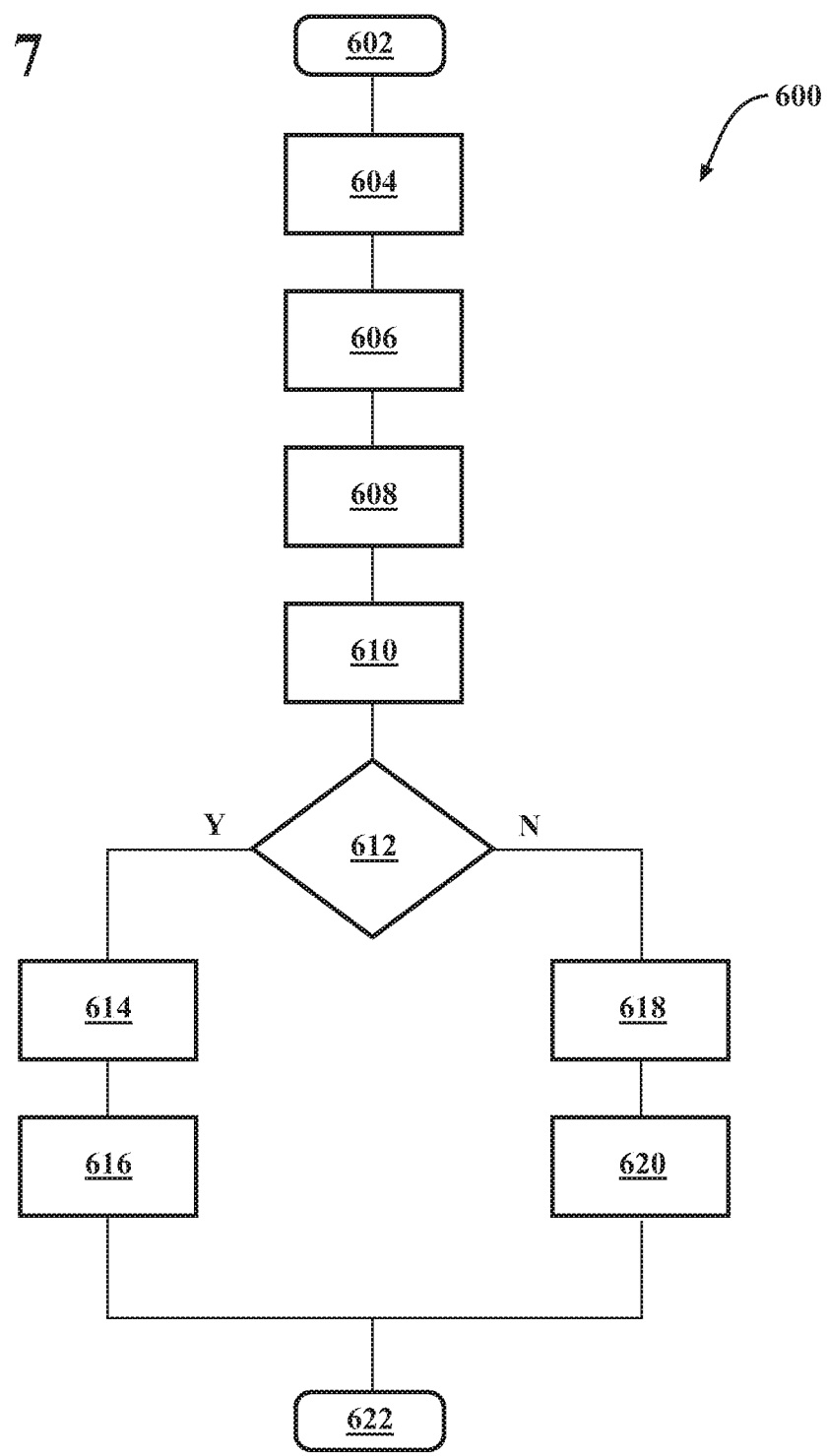

SYSTEM AND PROCESS FOR CLOSEST IN PATH VEHICLE FOLLOWING USING SURROUNDING VEHICLES MOTION FLOW

INTRODUCTION

The disclosure generally relates to a system and process for closest in path vehicle following using surrounding vehicles motion flow for an autonomous or semi-autonomous vehicle.

Navigation systems and methods for autonomous and semi-autonomous vehicles utilize computerized algorithms to determine a navigational path for the vehicle being controlled. Digital maps and sensor inputs are useful to set the navigational path for the vehicle. Sensor inputs may include image recognition of lane markers and street features. Sensor inputs may further include image, radar, light detection and ranging (LiDAR), or other similar sensor recognition types to monitor locations of other vehicles relative to the vehicle being controlled, for example, to prevent the vehicle being controlled from getting too close to another vehicle in traffic.

SUMMARY

A system for closest in path vehicle following using surrounding vehicles motion flow is provided. The system includes a sensor device of a host vehicle generating data related to a plurality of vehicles upon a drivable surface in front of the host vehicle. The system further includes a navigation controller including a computerized processor operable to monitor the data from the sensor device, define a portion of the plurality of vehicles as a swarm of vehicles, identify one of the plurality of vehicles as a closest in path vehicle to be followed, evaluate the data to determine whether the closest in path vehicle to be followed is exhibiting good behavior in relation to the swarm of vehicles, and, when the closest in path vehicle to be followed is exhibiting the good behavior, generate a breadcrumbing navigation path based upon the data. The system further includes a vehicle controller controlling the host vehicle based upon the breadcrumbing navigation path.

In some embodiments, evaluating the data includes comparing a heading of the closest in path vehicle to be followed to a heading of the swarm of vehicles to determine a heading error of the closest in path vehicle to be followed, comparing a curvature of the closest in path vehicle to be followed to a curvature of the swarm of vehicles to determine a curvature error of the closest in path vehicle to be followed, and determining the closest in path vehicle to be exhibiting the good behavior based upon the heading error and the curvature error.

In some embodiments, the system further includes the computerized processor being further operable to determine a speed of the closest in path vehicle to be followed, determine an average speed of the swarm of vehicles, and determine a relative position of the closest in path vehicle to be followed to the swarm of vehicles. The system further includes evaluating the data to determine whether the closest in path vehicle to be followed is exhibiting the good behavior in relation to the swarm of vehicles when a speed difference between the speed of the closest in path vehicle to be followed and the average speed of the swarm of vehicles is less than a threshold speed difference and when the relative position of the closest in path vehicle to be followed to the swarm of vehicles is closer than a threshold distance.

In some embodiments, the computerized processor is further operable to warn a driver of the host vehicle when the closest in path vehicle to be followed is not exhibiting the good behavior.

In some embodiments, generating the breadcrumbing navigation path based upon the data includes weighting the closest in path vehicle as a high-quality candidate to be followed based upon the good behavior.

In some embodiments, the sensor device includes one of a camera device, a radar device, a LiDAR device, or an ultrasonic device.

In some embodiments, the vehicle controller further controls a distance from the closest in path vehicle to be followed based upon the closest in path vehicle to be followed exhibiting the good behavior.

In some embodiments, the vehicle controller further controls autonomous braking based upon the closest in path vehicle to be followed exhibiting the good behavior.

In some embodiments, defining the portion of the plurality of vehicles as the swarm of vehicles includes determining a speed of a first vehicle of the plurality of vehicles, determining a speed of a second vehicle of the plurality of vehicles, determining a relative position of the first vehicle to the second vehicle, and defining the first vehicle and the second vehicle as the swarm of vehicles when a speed difference between the speed of the first vehicle and the speed of the second vehicle is less than a threshold speed difference and when the relative position of the first vehicle to the second vehicle is closer than a threshold distance.

In some embodiments, defining the portion of the plurality of vehicles as the swarm of vehicles further includes determining a speed of a third vehicle of the plurality of vehicles, determining an average speed of the swarm of vehicles, determining a relative position of the third vehicle to the swarm of vehicles. Defining the portion of the plurality of vehicles as the swarm of vehicles further includes defining the swarm of vehicles to include the third vehicle when a speed difference between the speed of the third vehicle and the average speed of the swarm of vehicles is less than the threshold speed difference and when the relative position of the third vehicle to the swarm of vehicles is closer than the threshold distance.

According to one alternative embodiment, a system for closest in path vehicle following using surrounding vehicles motion flow is provided. The system includes a sensor device of a host vehicle generating data related to a plurality of vehicles upon a drivable surface in front of the host vehicle. The system further includes a navigation controller including a computerized processor operable to monitor the data from the sensor device, define a portion of the plurality of vehicles as a swarm of vehicles, identify one of the plurality of vehicles as a closest in path vehicle to be followed, evaluate the data to determine whether the closest in path vehicle to be followed is exhibiting good behavior in relation to the swarm of vehicles, and, when the closest in path vehicle to be followed is exhibiting the good behavior, generate a breadcrumbing navigation path based upon the data. The generating includes weighting the closest in path vehicle as a high-quality candidate to be followed based upon the good behavior. The evaluating includes comparing a heading of the closest in path vehicle to be followed to a heading of the swarm of vehicles to determine a heading error of the closest in path vehicle to be followed, comparing a curvature of the closest in path vehicle to be followed to a curvature of the swarm of vehicles to determine a curvature error of the closest in path vehicle to be followed, and determining the closest in path vehicle to be exhibiting the good behavior based upon the heading error and the curvature error. The system further includes a vehicle controller controlling the host vehicle based upon the breadcrumbing navigation path.

In some embodiments, the computerized processor is further operable to determine a speed of the closest in path vehicle to be followed, determine an average speed of the swarm of vehicles, and determine a relative position of the closest in path vehicle to be followed to the swarm of vehicles. The computerized processor is further operable to evaluate the data to determine whether the closest in path vehicle to be followed is exhibiting the good behavior in relation to the swarm of vehicles when a speed difference between the speed of the closest in path vehicle to be followed and the average speed of the swarm of vehicles is less than a threshold speed difference and when the relative position of the closest in path vehicle to be followed to the swarm of vehicles is closer than a threshold distance.

In some embodiments, the computerized processor is further operable to warn a driver of the host vehicle when the closest in path vehicle to be followed is not exhibiting the good behavior.

In some embodiments, the sensor device includes one of a camera device, a radar device, a LiDAR device, or an ultrasonic device.

In some embodiments, the vehicle controller further controls a distance from the closest in path vehicle to be followed based upon the closest in path vehicle to be followed exhibiting the good behavior.

In some embodiments, the vehicle controller further controls autonomous braking based upon the closest in path vehicle to be followed exhibiting the good behavior.

According to one alternative embodiment, a process for closest in path vehicle following using surrounding vehicles motion flow is provided. The process includes, within a computerized processor of a host vehicle, monitoring the data from a sensor device collecting data related to a plurality of vehicles upon a drivable surface in front of the host vehicle, defining a portion of the plurality of vehicles as a swarm of vehicles, identifying one of the plurality of vehicles as a closest in path vehicle to be followed, and evaluating the data to determine whether the closest in path vehicle to be followed is exhibiting good behavior in relation to the swarm of vehicles. The process further includes, when the closest in path vehicle to be followed is exhibiting the good behavior, generating a breadcrumbing navigation path based upon the data and controlling the host vehicle based upon the breadcrumbing navigation path.

In some embodiments, evaluating the data includes comparing a heading of the closest in path vehicle to be followed to a heading of the swarm of vehicles to determine a heading error of the closest in path vehicle to be followed, comparing a curvature of the closest in path vehicle to be followed to a curvature of the swarm of vehicles to determine a curvature error of the closest in path vehicle to be followed, and determining the closest in path vehicle to be exhibiting the good behavior based upon the heading error and the curvature error.

In some embodiments, the process further includes, within the computerized processor, determining a speed of the closest in path vehicle to be followed, determining an average speed of the swarm of vehicles and determining a relative position of the closest in path vehicle to be followed to the swarm of vehicles The process further includes evaluating the data to determine whether the closest in path vehicle to be followed is exhibiting the good behavior in relation to the swarm of vehicles when a speed difference between the speed of the closest in path vehicle to be followed and the average speed of the swarm of vehicles is less than a threshold speed difference and when the relative position of the closest in path vehicle to be followed to the swarm of vehicles is closer than a threshold distance.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 schematically illustrates exemplary control architecture useful to operate the disclosed process and system, in accordance with the present disclosure;

FIG. 3 schematically illustrates an exemplary data communication system within a vehicle being controlled, in accordance with the present disclosure;

FIG. 7 is a flowchart illustrating an exemplary process 600 to evaluate a CIPV target and determine whether the CIPV target is exhibiting good CIPV behavior or bad CIPV behavior, in accordance with the present disclosure.

DETAILED DESCRIPTION

Figure 1:
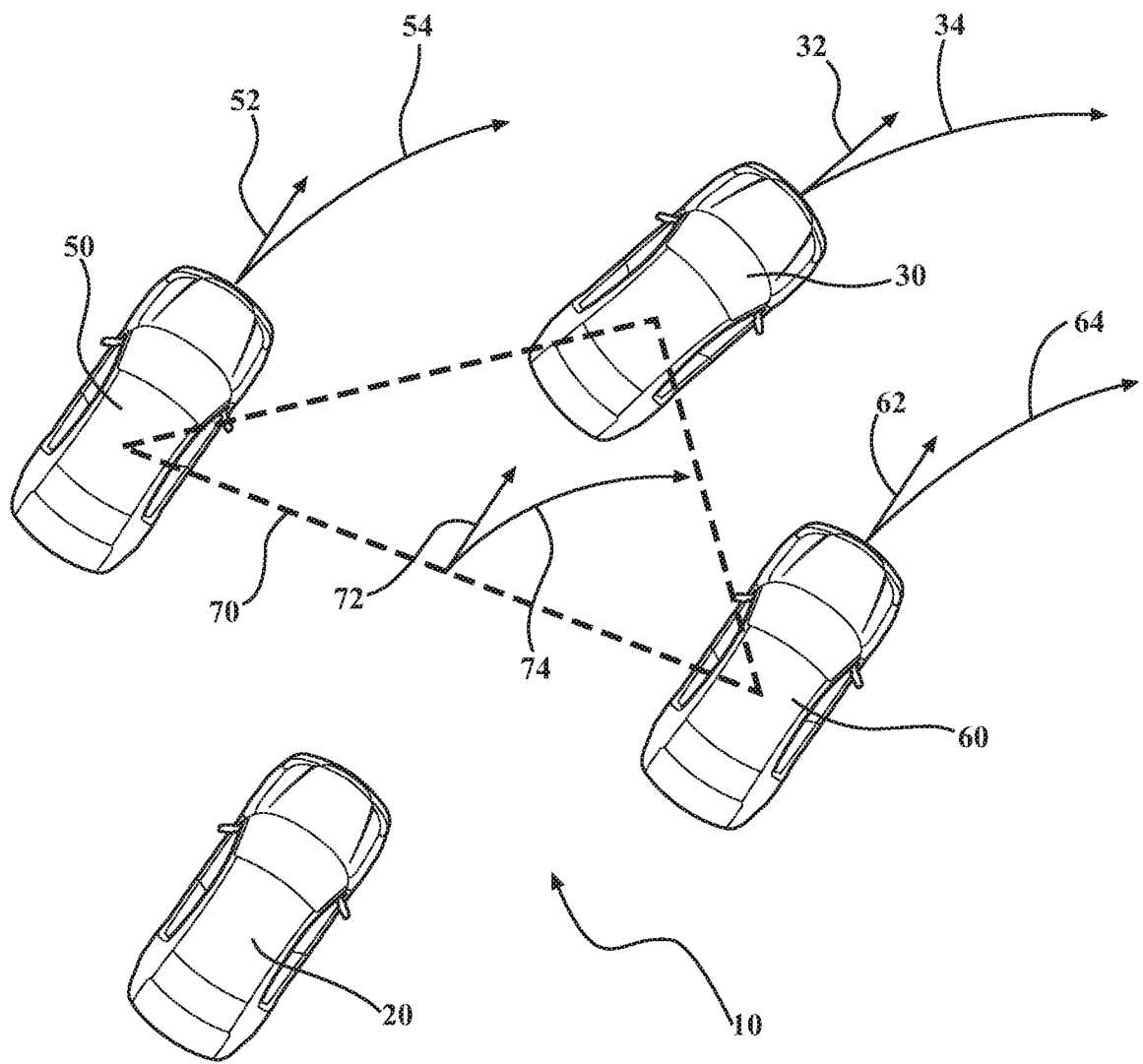
FIG. 1 illustrates terms which may be useful in defining a process to quantify CIPV behavior, in accordance with the present disclosure.

A process and system for closest vehicle in path following for an autonomous or semi-autonomous host vehicle is provided including a real-time determination whether a closest vehicle in a current path for the vehicle being controlled is exhibiting good behavior worthy of being followed or bad behavior indicating that the host vehicle is not to be followed by the closest in path vehicle.

Breadcrumbing navigation by following the closest vehicle in path or Closest In Path Vehicle (CIPV) may be used to deal with intermittent lane marking quality in lane following control. Breadcrumbing refers to utilizing locations of other vehicles in the path of the vehicle being controlled to set a path for the vehicle being controlled. Breadcrumbing navigation strategies may not differentiate good CIPV behavior versus bad CIPV behavior. A real-time process and system are provided that analyzes and determines a quality of CIPV behavior in light of behavior of other vehicles close to the CIPV. A close grouping of vehicles may be described as a swarm of vehicles. Individuals may drive poorly or exhibit bad behavior. However, a swarm including a plurality of drivers and exhibiting consistent behavior in relation to each other is more likely to represent acceptable driving behavior. A swarm of vehicles traveling down a roadway at consistent speeds and each traveling consistently within its own lane may collectively be useful to set a standard for good vehicle behavior. By comparing behavior of a CIPV to behavior of a swarm of vehicles or a swarm of vehicles to which the CIPV belongs, the behavior of the CIPV may be analyzed and graded.

By examining the CIPV driver's behavior and selectively employing location and trajectory data from the CIPV for breadcrumbing path planning, the disclosed system may increase feature availability and safety. The breadcrumbing data collected and certified to be high-quality may be used individually or may be used to reinforce and rationalize camera inputs for lane following. The disclosed system may provide better camera/lane interpretation, vision range, and quality without new hardware. In one embodiment, the disclosed process and system compares CIPV states including but not limited to a heading error and a curvature error to data related to the swarm of vehicles to certify and selectively utilize high-quality CIPV data. Heading error describes an error between an actual heading of the CIPV from a nominal or desired heading based upon behavior of the swarm. Curvature error describes an error between a curvature navigated by the CIPV as compared to a nominal or desired curvature based upon behavior of the swarm. By measuring or estimating heading error and curvature error of the CIPV in relation to the swarm, the behavior of the CIPV as a candidate to be followed may be evaluated. As described herein, behavior of a CIPV may be classified as good behavior as compared to the swarm or bad behavior as compared to the swarm. Other descriptors may be substituted for good or bad, for example, by terms such as swarm compliant behavior, swarm non-compliant behavior, threshold swarm stable behavior, and swarm unstable behavior.

An exemplary algorithm for determining or quantifying a behavior of a CIPV as a candidate to be followed is provided as Equation 1.

$$f(X_c) = \int_{t-\Delta t}^{t} (\alpha_1 |e_\psi| + \alpha_2 |e_\rho|) dt + \alpha_3 \int_{\omega=0 \, Hz}^{5 \, Hz} \text{FFT}(\langle e_\psi \rangle_t, \langle e_\rho \rangle_t)^2 d\omega \quad [1]$$

Equations 2 and 3 describe terms in Equation 1.

$$e_\psi = \psi_{cipv} - \psi_{swarm} \quad [2]$$

$$e_\rho = \rho_{cipv} - (\rho_{swarm}) \quad [3]$$

$e_\psi$ describes a heading error for the CIPV. $e_\rho$ describes a curvature error for the CIPV. Terms $\alpha_1$, $\alpha_2$, and $\alpha_3$ describe weighting factors for quantification. The term $\Delta t$ describes a length of moving time window. The operation FFT describes a Fast Fourier Transform algorithm applied within Equation 1. The term $\omega$ describes a frequency of low energy band. Equations 4 and 5 further describe terms of Equation 1, describing the vector over window the past $\Delta t_2$ seconds since $t_{now}$.

$$\langle e_\psi \rangle_{t_{now}} = \{e_\psi(t) : \forall t \in [t_{now} - \Delta t_2, t_{now}]\} \quad [4]$$

$$\langle e_\rho \rangle_{t_{now}} = \{e_\rho(t) : \forall t \in [t_{now} - \Delta t_2, t_{now}]\} \quad [5]$$

Equation 1 is provided as an exemplary algorithm for evaluating whether a target CIPV exhibits good CIPV behavior or bad CIPV behavior. A number of alternative algorithms are envisioned, and the disclosure is not intended to be limited to the examples provided herein.

FIG. 1 illustrates terms which may be useful in defining a process to quantify CIPV 30 behavior. A portion of the terms of Equation 1 are described in FIG. 1. Host vehicle 20 being controlled is illustrated upon a road surface 10. The CIPV 30 or the CIPV target is illustrated upon the road surface 10. Additionally, vehicle 50 and vehicle 60 are illustrated upon the road surface 10. The CIPV 30, the vehicle 50, and the vehicle 60 are close to each other and are traveling at a relatively similar speed such that swarm 70 including the CIPV 30, the vehicle 50, and the vehicle 60 may be defined.

Various terms may be defined describing the CIPV 30 and its motion in relation to the road surface 10 and the swarm 70. Term 32 describes $e_\psi$ or a heading error for the CIPV 30. Term 34 describes $e_\rho$ or a curvature error for the CIPV 30. Term 52 describes a heading error for the vehicle 50. Term 54 describes a curvature error for the vehicle 50. Term 62 describes a heading error for the vehicle 60. Term 64 describes a curvature error for the vehicle 60. Term 72 describes an average heading error for the swarm 70. Term 74 describes an average curvature error for the swarm 70.

Controlling the host vehicle based upon a breadcrumbing navigation path may include a number of alternative embodiments. In one exemplary embodiment, the host vehicle may include equipment to determine a lane geometry on the drivable surface. The vehicle may include a controller to fuse the lane geometry with the breadcrumbing navigation path to create a fused navigation path. A trajectory of the host vehicle may then be controlled based upon the fused navigation path.

FIG. 2 schematically illustrates exemplary control architecture useful to operate the disclosed process and system. Control architecture 100 is illustrated including camera device 110, digital map database 120, data fusion module 130, mission planning module 140, longitudinal controller 150, lateral controller 160, and electronic power steering/acceleration/braking module 170. Camera device 110 captures a series of images related to an environment around and in the path of the vehicle being controlled, including but not limited to images of the road surface, images of lane markers, images of potential obstacles near the vehicle, images of vehicles around the vehicle being controlled, and other images of relevant information to controlling a vehicle. Digital map database 120 includes data regarding an area around the vehicle being controlled including historically documented road geometry, synthesized data such as vehicle to vehicle or infrastructure to vehicle data regarding road geometry, and other information that may be monitored and stored about a particular area upon which the vehicle may travel. Data fusion module 130 includes CIPV module 132, CIPV behavior analysis module 134, and breadcrumbing navigation module 136. CIPV module 132 gathers information regarding a CIPV and a swarm of vehicles and generates data from the information including exemplary values of trajectory the CIPV within a lane of travel and in relation to the swarm. CIPV behavior analysis module 134 receives the generated data from CIPV module 132 and analyzes the data to determine whether CIPV is exhibiting good CIPV behavior or bad CIPV behavior. If CIPV behavior analysis module 134 determines that the CIPV is exhibiting good CIPV behavior, breadcrumbing navigation module 136 utilizes data from CIPV module 132 to generate a breadcrumbing navigation plot, enabling the vehicle being controlled to base navigational movements partially or wholly upon the movement of/following the CIPV.

Mission planning module 140 utilizes the breadcrumbing navigation plot from breadcrumbing navigation module 136 and other available information to generate a commanded navigation plot. Longitudinal controller 150 and lateral controller 160 utilize the commanded navigation plot to determine desired vehicle speed and desired vehicle trajectory. Electronic power steering/acceleration/braking module 170 utilizes outputs from longitudinal controller 150 and lateral controller 160 to effect control over navigation of the host vehicle 20. Control architecture 100 is provided as one exemplary embodiment of a control architecture that may be utilized to implement the disclosed process and system. Other embodiments are envisioned, and the disclosure is not intended to be limited to the examples provided herein.

FIG. 3 schematically illustrates an exemplary data communication system within a vehicle being controlled. Data communication system 200 is illustrated including a camera device 110, a digital map database 120, a sensor device 210, a navigational controller 220, and a vehicle controller 230, each respectively communicatively connected to vehicle data bus 240. Sensor device 210 may include one or more of a radar device, LiDAR device, ultrasonic device, or other similar device useful for gathering data about the environment of a vehicle and behavior of other vehicles upon a roadway. Vehicle data bus 240 includes a communication network capable of transferring data quickly back and forth between various connected devices and modules. Data may be collected from each of camera device 110, digital map database 120, and sensor device 210 and transferred to navigational controller 220. Navigational controller 220 includes a computerized processor and programmed code operable to create a commanded navigation plot useful to navigate the vehicle being controlled over a road surface around the vehicle.

Figure 4:
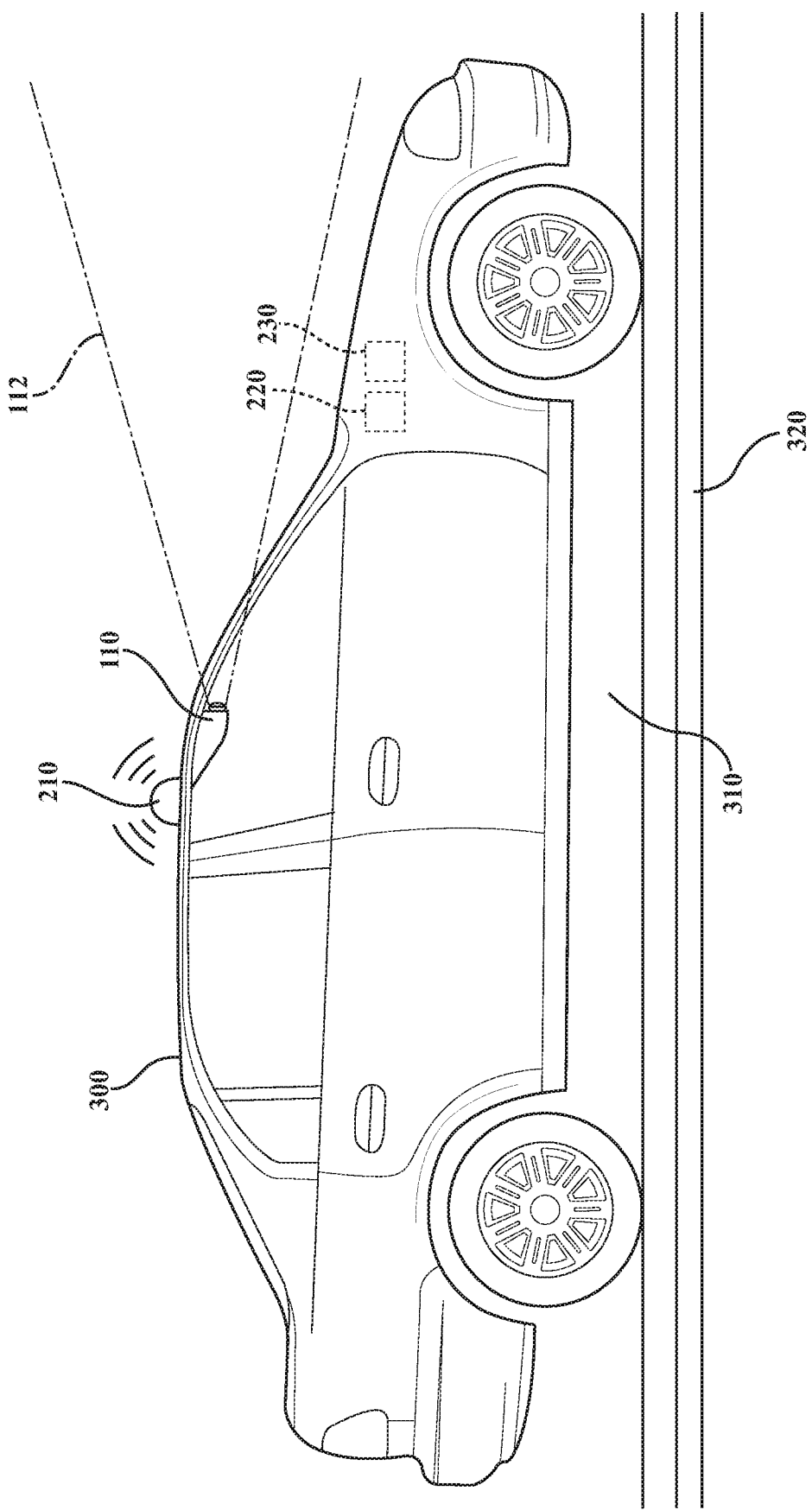
FIG. 4 illustrates an exemplary vehicle being controlled by the disclosed process and system, including devices and modules useful to certifying a CIPV target as high-quality, in accordance with the present disclosure.

FIG. 4 illustrates an exemplary vehicle being controlled by the disclosed process and system, including devices and modules useful to certifying a CIPV target as high-quality. Vehicle being controlled 300 is illustrated upon road surface 310 including lane markings 320. Vehicle 300 is illustrated including navigation controller 220, vehicle controller 230, camera device 110, and sensor device 210. Camera device 110 includes field of view 112 and is positioned to capture images of road surface 310 and other objects and obstacles near vehicle being controlled 300, including a nearby vehicle that may be a CIPV. Sensor device 210 may additionally provide data regarding objects near vehicle being controlled 300. Navigation controller 220 receives data from camera device 110 and other sources and generates a commanded navigation plot according to the disclosed process. Vehicle controller 230 utilizes the commanded navigation plot to control navigation of vehicle being controlled 300 upon road surface 310. Vehicle being controlled 300 is provided as an exemplary vehicle utilizing the disclosed process and system. Other embodiments are envisioned, and the disclosure is not intended to be limited to the examples provided herein.

Figure 5:
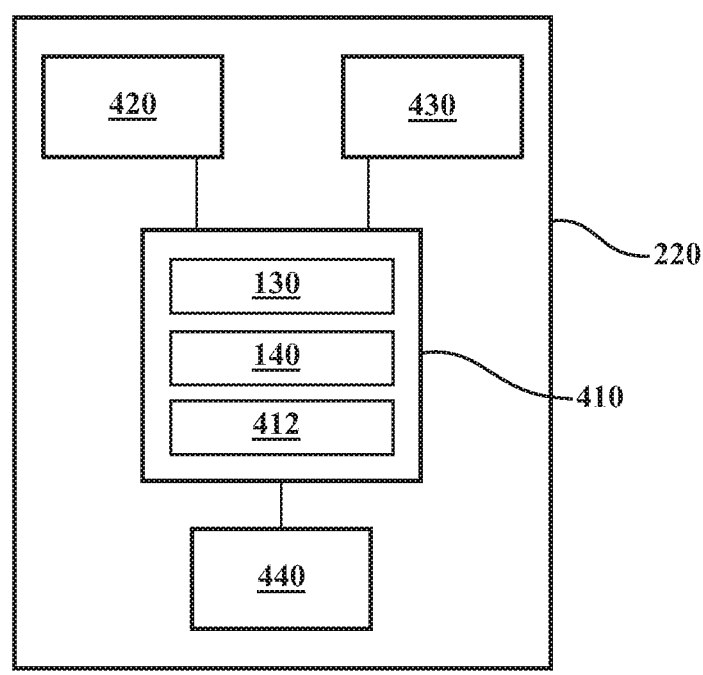
FIG. 5 schematically illustrates an exemplary computerized navigation controller, in accordance with the present disclosure.

Various controllers may be utilized within the disclosed system to operate the disclosed process. Controllers may include a computerized device including a computerized processor including memory capable of storing programmed executable code. A controller may be operated upon a single computerized device or may span several computerized devices. FIG. 5 schematically illustrates an exemplary computerized navigation controller. Navigation controller 220 includes computerized processor device 410, communications module 430, data input/output module 420, and memory storage device 440. It is noted that navigation controller 220 may include other components and some of the components are not present in some embodiments.

The processor device 410 may include memory, e.g., read only memory (ROM) and random-access memory (RAM), storing processor-executable instructions and one or more processors that execute the processor-executable instructions. In embodiments where the processor device 410 includes two or more processors, the processors may operate in a parallel or distributed manner. Processor device 410 may execute the operating system of the navigation controller 220. Processor device 410 may include one or more modules executing programmed code or computerized processes or methods including executable steps. Illustrated modules may include a single physical device or functionality spanning multiple physical devices. In the illustrative embodiment, the processor device 410 also includes data fusion module 130, mission planning module 140, and lane data synthesis module 412, which are described in greater detail below.

The data input/output module 420 is a device that is operable to take data gathered from sensors and devices throughout the vehicle and process the data into formats readily usable by processor device 410. Data input/output module 420 is further operable to process output from processor device 410 and enable use of that output by other devices or controllers throughout the vehicle.

The communications module 430 may include a communications/data connection with a bus device configured to transfer data to different components of the system and may include one or more wireless transceivers for performing wireless communication.

The memory storage device 440 is a device that stores data generated or received by the navigation controller 220. The memory storage device 440 may include, but is not limited to, a hard disc drive, an optical disc drive, and/or a flash memory drive.

The data fusion module 130 is described in relation to FIG. 2 and may include programming operable to monitor data regarding a CIPV target, evaluate whether the CIPV target is exhibiting good CIPV behavior based upon the data regarding the CIPV target and a swarm of vehicles, and selectively generate a breadcrumbing navigation plot.

Mission planning module 140 is described in relation to FIG. 2 and may include programming operable to generate a commanded navigation plot based upon the generated breadcrumbing navigation plot and other navigational information such as lane data generated by lane data synthesis module 412.

Lane data synthesis module 412 monitors information related to a current lane of travel from various sources, including data from a camera device, data from a sensor device, data from a digital map device, and lane data synthesis module 412 projects or estimates the metes and bounds of a current lane of travel from available sources. Map error may exist within the map database or in data related to a current location. Lane data synthesis module 412 may include algorithms useful to localize information, fuse various sources of information, and reduce map error. These metes and bounds are made available to other modules as lane data.

Navigation controller 220 is provided as an exemplary computerized device capable of executing programmed code to evaluate and selectively utilize data from a CIPV target to generate a breadcrumbing navigation plot. A number of different embodiments of navigation controller 220, devices attached thereto, and modules operable therein are envisioned, and the disclosure is not intended to be limited to examples provided herein.

Figure 6:
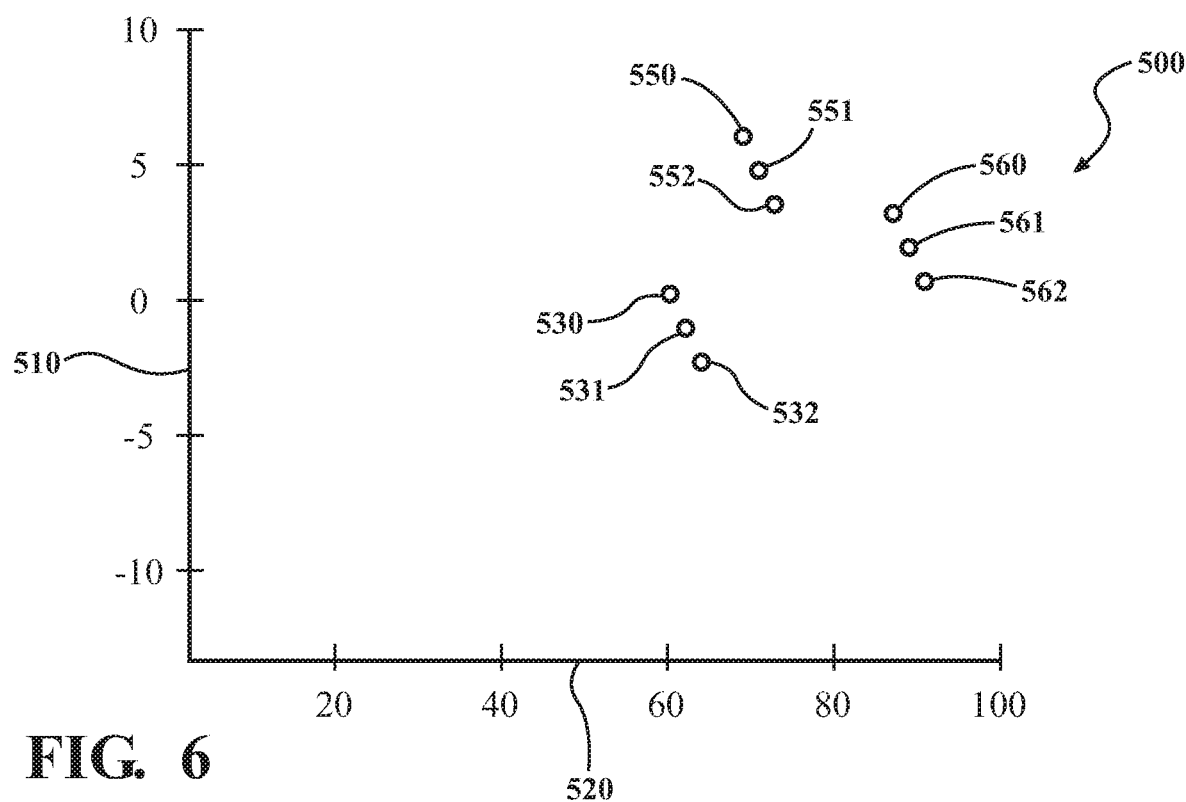
FIG. 6 graphically illustrates exemplary positional data collected regarding a swarm of vehicles including a CIPV target through a time span, in accordance with the present disclosure.

FIG. 6 graphically illustrates exemplary positional data collected regarding a swarm of vehicles including a CIPV target through a time span. Graph 500 is provided. A vertical axis 510 is illustrated representing a lateral distance from each data point to a centerline of the host vehicle. A horizontal axis 520 is illustrated representing a longitudinal distance from each data point to the host vehicle. Related to a CIPV target, a first data point 530 taken at an earliest point in time, a second data point 531 taken later than the earliest point in time, and a third data point 532 taken at a later point in time than the second data point 531 are illustrated. The time span of the data extends from the earliest point in time that the first data point 530 is taken to the time that the third data point 532 is taken. Related to a second vehicle in the swarm, a first data point 550 taken at the earliest point in time, a second data point 551 taken at a same time as the second data point 531, and a third data point 552 taken at a same time as the third data point 532 are illustrated. Related to a third vehicle in the swarm, a first data point 560 taken at the earliest point in time, a second data point 561 taken at the same time as the second data point 531, and a third data point 562 taken at the same time as the third data point 532 are illustrated. Through analysis of the various data points, details about position and movement of the various vehicles may be analyzed and evaluated.

FIG. 7 is a flowchart illustrating an exemplary process 600 to evaluate a CIPV target and determine whether the CIPV target is exhibiting good CIPV behavior or bad CIPV behavior. The process 600 starts at step 602. At step 604, a CIPV target is identified. At step 606, a swarm of vehicles close to the CIPV target and potentially including the CIPV target is identified. Close to the CIPV target may be defined according to a threshold distance, for example, being within ten to twenty meters of the CIPV target. At step 608, velocities of the CIPV target and the other vehicles of the swarm are determined. At step 610, a relative position of the CIPV target to each of the other vehicles of the swarm are determined. At step 612, a velocity of the CIPV target, the velocities of the other vehicles of the swarm, and the relative position of the CIPV target to the other vehicles of the swarm is analyzed. As part of this analysis, a determination is made whether the CIPV target may be considered part of the swarm. If the CIPV target may be considered part of the swarm, the process 600 advances to step 614. If the CIPV target may not be considered part of the swarm, the process 600 advances to step 618.

At step 614, when the CIPV target may be considered part of the swarm, the CIPV may be weighted as a high-quality candidate for breadcrumbing navigation. At step 616, data regarding the CIPV target may be forwarded to breadcrumbing navigation module 136. The process 600 then advances to step 622 where the process ends.

At step 618, when the CIPV target may not be considered part of the swarm, the CIPV may be weighted as a low-quality candidate for breadcrumbing navigation. At step 620, the driver may be informed that the CIPV target is unreliable. In one optional embodiment, the driver may be given the option to select a new CIPV target or to take manual control of the host vehicle. The process 600 then advances to step 622 where the process ends.

Process 600 is provided as an exemplary process to evaluate and selectively utilize data from a CIPV for breadcrumbing navigation. A number of similar processes are envisioned, and the disclosure is not intended to be limited to the examples provided herein.

A number of different processes may be used to identify a swarm of vehicles. At step 612 a velocity of the CIPV target, the velocities of the other vehicles of the swarm, and the relative position of the CIPV target to the other vehicles of the swarm is analyzed. As part of this analysis, a determination is made whether the CIPV target may be considered part of the swarm. Similarly, a plurality of vehicles in front of the host vehicle may be analyzed, and some portion of the plurality of vehicles may have velocities and relative positions to each other analyzed. In order to identify the portion of the plurality of vehicles as a swarm, the navigation controller may determine that a speed of a first vehicle and a speed of a second vehicle are within a threshold speed difference and that the relative position of the first vehicle to the second vehicle is within a threshold distance and may subsequently identify the first vehicle and the second vehicle as a swarm. Similar determinations may be made between the swarm including the first vehicle and the second vehicle in comparison to a third vehicle to determine whether third vehicle should be included in the swarm. Swarms with larger numbers of vehicles may be identified as more reliable or given more weight as compared to smaller swarms with two or three vehicles.

Navigation plots described herein may be useful to command navigation of a fully autonomous vehicle. Similarly, navigation plots described herein may be useful to command navigation of a semi-autonomous vehicle, for example, to provide automated braking, lane-tending, or obstacle avoidance. Similarly, navigation plots described herein may be useful to provide navigational aids such as projected graphics or generated sounds to aid a driver in efficiently controlling a vehicle. Examples are provided herein of how generated navigation plots may be utilized. Other embodiments are envisioned, and the disclosure is not intended to be limited to the examples provided herein.

A breadcrumbing navigation path, once generated by the present process and system, may be useful to create or influence a fused navigation path useful to guide or autonomously drive the vehicle. Such a breadcrumbing navigation path or, in particular, a determination of bad behavior of the CIPV may be used to further modulate other factors such as distance kept away from the CIPV. For example, if a CIPV is scoring high marks for good behavior a normal following distance may be implemented. If that same CIPV begins to exhibit bad behavior, for example, as a result of the driver becoming distracted, the bad behavior may be utilized to instruct the host vehicle to increase a distance from the CIPV based upon a decreased ability to trust that driver. In another exemplary embodiment, a determination of bad behavior of the CIPV may be used to command automatic braking or slowing of the vehicle. In another embodiment, the driver of the host vehicle may additionally or alternatively be warned, for example, with visual graphics or an audio warning, if the CIPV exhibits bad behavior.

The disclosed process and system describe an improvement of feature availability for autonomous and semi-autonomous vehicles. In conditions where some navigation processes would lack sufficient data and guidance to effectively navigate the vehicle, for example, in a construction zone with missing, contradictory, or displaced lane markings, the disclosed process and system may be used to validate and successfully utilize a path of a CIPV in front of the host vehicle to navigate the vehicle through the exemplary construction zone.

While the best modes for carrying out the disclosure have been described in detail, those familiar with the art to which this disclosure relates will recognize various alternative designs and embodiments for practicing the disclosure within the scope of the appended claims.

What is claimed is:

1. A system for closest in path vehicle following using surrounding vehicles motion flow, comprising:
   a sensor device of a host vehicle generating data related to a plurality of vehicles upon a drivable surface in front of the host vehicle;
   a navigation controller including a computerized processor configured to:
   monitor the data from the sensor device;

define a portion of the plurality of vehicles as a swarm of vehicles;
identify one of the plurality of vehicles as a closest in path vehicle to be followed;
evaluate the data to determine whether the closest in path vehicle to be followed is exhibiting good behavior in relation to the swarm of vehicles; and
when the closest in path vehicle to be followed is exhibiting the good behavior, generate a breadcrumbing navigation path based upon the data;
a vehicle controller controlling the host vehicle based upon the breadcrumbing navigation path; and
wherein evaluating the data includes:
comparing a heading of the closest in path vehicle to be followed to a heading of the swarm of vehicles to determine a heading error of the closest in path vehicle to be followed;
comparing a curvature of the closest in path vehicle to be followed to a curvature of the swarm of vehicles to determine a curvature error of the closest in path vehicle to be followed; and
determining the closest in path vehicle to be exhibiting the good behavior based upon the heading error and the curvature error.

2. The system of claim 1, further comprising the computerized processor being further configured to warn a driver of the host vehicle when the closest in path vehicle to be followed is not exhibiting the good behavior.

3. The system of claim 1, wherein the sensor device includes one of a camera device, a radar device, a LiDAR device, or an ultrasonic device.

4. The system of claim 1, wherein the vehicle controller further controls a distance from the closest in path vehicle to be followed based upon the closest in path vehicle to be followed exhibiting the good behavior.

5. The system of claim 1, wherein the vehicle controller further controls autonomous braking based upon the closest in path vehicle to be followed exhibiting the good behavior.

6. A system for closest in path vehicle following using surrounding vehicles motion flow, comprising:
a sensor device of a host vehicle generating data related to a plurality of vehicles upon a drivable surface in front of the host vehicle;
a navigation controller including a computerized processor configured to:
monitor the data from the sensor device;
define a portion of the plurality of vehicles as a swarm of vehicles;
identify one of the plurality of vehicles as a closest in path vehicle to be followed;
evaluate the data to determine whether the closest in path vehicle to be followed is exhibiting good behavior in relation to the swarm of vehicles; and
when the closest in path vehicle to be followed is exhibiting the good behavior, generate a breadcrumbing navigation path based upon the data;
a vehicle controller controlling the host vehicle based upon the breadcrumbing navigation path; and
further comprising the computerized processor being further configured to:
determine a speed of the closest in path vehicle to be followed;
determine an average speed of the swarm of vehicles;
determine a relative position of the closest in path vehicle to be followed to the swarm of vehicles; and
evaluate the data to determine whether the closest in path vehicle to be followed is exhibiting the good behavior in relation to the swarm of vehicles when a speed difference between the speed of the closest in path vehicle to be followed and the average speed of the swarm of vehicles is less than a threshold speed difference and when the relative position of the closest in path vehicle to be followed to the swarm of vehicles is closer than a threshold distance.

7. The system of claim 6, further comprising the computerized processor being further configured to warn a driver of the host vehicle when the closest in path vehicle to be followed is not exhibiting the good behavior.

8. The system of claim 6, wherein the sensor device includes one of a camera device, a radar device, a LiDAR device, or an ultrasonic device.

9. The system of claim 6, wherein the vehicle controller further controls a distance from the closest in path vehicle to be followed based upon the closest in path vehicle to be followed exhibiting the good behavior.

10. The system of claim 6, wherein the vehicle controller further controls autonomous braking based upon the closest in path vehicle to be followed exhibiting the good behavior.

11. A system for closest in path vehicle following using surrounding vehicles motion flow, comprising:
a sensor device of a host vehicle generating data related to a plurality of vehicles upon a drivable surface in front of the host vehicle;
a navigation controller including a computerized processor configured to:
monitor the data from the sensor device;
define a portion of the plurality of vehicles as a swarm of vehicles;
identify one of the plurality of vehicles as a closest in path vehicle to be followed;
evaluate the data to determine whether the closest in path vehicle to be followed is exhibiting good behavior in relation to the swarm of vehicles; and
when the closest in path vehicle to be followed is exhibiting the good behavior, generate a breadcrumbing navigation path based upon the data;
a vehicle controller controlling the host vehicle based upon the breadcrumbing navigation path; and
wherein generating the breadcrumbing navigation path based upon the data includes weighting the closest in path vehicle as a high-quality candidate to be followed based upon the good behavior.

12. The system of claim 11, further comprising the computerized processor being further configured to warn a driver of the host vehicle when the closest in path vehicle to be followed is not exhibiting the good behavior.

13. The system of claim 11, wherein the sensor device includes one of a camera device, a radar device, a LiDAR device, or an ultrasonic device.

14. The system of claim 11, wherein the vehicle controller further controls a distance from the closest in path vehicle to be followed based upon the closest in path vehicle to be followed exhibiting the good behavior.

15. The system of claim 11, wherein the vehicle controller further controls autonomous braking based upon the closest in path vehicle to be followed exhibiting the good behavior.

16. A system for closest in path vehicle following using surrounding vehicles motion flow, comprising:
a sensor device of a host vehicle generating data related to a plurality of vehicles upon a drivable surface in front of the host vehicle;
a navigation controller including a computerized processor configured to:
monitor the data from the sensor device;

define a portion of the plurality of vehicles as a swarm of vehicles;
identify one of the plurality of vehicles as a closest in path vehicle to be followed;
evaluate the data to determine whether the closest in path vehicle to be followed is exhibiting good behavior in relation to the swarm of vehicles; and
when the closest in path vehicle to be followed is exhibiting the good behavior, generate a breadcrumbing navigation path based upon the data;
a vehicle controller controlling the host vehicle based upon the breadcrumbing navigation path; and
wherein defining the portion of the plurality of vehicles as the swarm of vehicles includes:
determining a speed of a first vehicle of the plurality of vehicles;
determining a speed of a second vehicle of the plurality of vehicles;
determining a relative position of the first vehicle to the second vehicle; and
defining the first vehicle and the second vehicle as the swarm of vehicles when a speed difference between the speed of the first vehicle and the speed of the second vehicle is less than a threshold speed difference and when the relative position of the first vehicle to the second vehicle is closer than a threshold distance.

17. The system of claim 16, wherein defining the portion of the plurality of vehicles as the swarm of vehicles further includes:
determining a speed of a third vehicle of the plurality of vehicles;
determining an average speed of the swarm of vehicles;
determining a relative position of the third vehicle to the swarm of vehicles; and
defining the swarm of vehicles to include the third vehicle when a speed difference between the speed of the third vehicle and the average speed of the swarm of vehicles is less than the threshold speed difference and when the relative position of the third vehicle to the swarm of vehicles is closer than the threshold distance.

18. The system of claim 16, further comprising the computerized processor being further configured to warn a driver of the host vehicle when the closest in path vehicle to be followed is not exhibiting the good behavior.

19. The system of claim 16, wherein the vehicle controller further controls a distance from the closest in path vehicle to be followed based upon the closest in path vehicle to be followed exhibiting the good behavior.

20. The system of claim 16, wherein the vehicle controller further controls autonomous braking based upon the closest in path vehicle to be followed exhibiting the good behavior.

* * * * *